United States Patent
Huang et al.

(10) Patent No.: US 9,817,849 B2
(45) Date of Patent: Nov. 14, 2017

(54) IMAGE RECOGNITION METHOD FOR OFFLINE AND ONLINE SYNCHRONOUS OPERATION

(71) Applicant: VISCOVERY PTE. LTD., Singapore (SG)

(72) Inventors: Chun-Chieh Huang, Singapore (SG); Hsin-Yu Lin, Singapore (SG); Chao-Heng Hu, Singapore (SG)

(73) Assignee: VISCOVERY PTE. LTD., Singapore (SG)

( * ) Notice: Subject to any disclaimer, the term of this patent is extended or adjusted under 35 U.S.C. 154(b) by 994 days.

(21) Appl. No.: 14/090,826

(22) Filed: Nov. 26, 2013

(65) Prior Publication Data

US 2015/0149328 A1  May 28, 2015

(51) Int. Cl.
G06F 17/30 (2006.01)
H04N 5/44 (2011.01)
G06Q 30/06 (2012.01)
G06K 9/00 (2006.01)
(Continued)

(52) U.S. Cl.
CPC ..... *G06F 17/3028* (2013.01); *G06K 9/00979* (2013.01); *G06K 9/6292* (2013.01); *G06Q 30/0643* (2013.01); *H04N 1/00307* (2013.01); *H04N 5/44* (2013.01)

(58) Field of Classification Search
None
See application file for complete search history.

(56) References Cited

U.S. PATENT DOCUMENTS

2009/0003706 A1* 1/2009 Chen .................. G06K 9/00973
382/187
2011/0234825 A1* 9/2011 Liu ..................... H04N 5/23248
348/208.5

(Continued)

OTHER PUBLICATIONS

A. Lameira, R. Jesus and N. Correia, "Local object detection and recognition in mobile devices," 2012 19th International Conference on Systems, Signals and Image Processing (IWSSIP), Vienna, 2012, pp. 193-196 http://ieeexplore.ieee.org/stamp/stamp.jsp?tp=&arnumber=6208105&isnumber=6208076.*

*Primary Examiner* — Kathleen Palavecino
*Assistant Examiner* — Lance Cai
(74) *Attorney, Agent, or Firm* — Muncy, Geissler, Olds & Lowe, P.C.

(57) ABSTRACT

An image identifying method for offline and online synchronous operation is disclosed. When the mobile device focuses on an recognition target, images frames of an recognition target are retrieved and sent to an recognition server. The mobile device executes an offline recognition operation, and synchronously an recognition server executes an online recognition operation. A plurality of the matching data is saved in the mobile device, and a plurality of recognition data is saved in an recognition server, wherein the recognition data larger than the matching data. When the mobile device firstly generates the recognition result, the recognition result is displayed for user searching reference. If the mobile device receives an recognition result from the recognition server before the mobile device completing the recognition, the recognition result replied form the recognition server is displayed on the display monitor.

9 Claims, 8 Drawing Sheets

(51) Int. Cl.
*G06K 9/62* (2006.01)
*H04N 1/00* (2006.01)

(56) References Cited

U.S. PATENT DOCUMENTS

2013/0260727 A1* 10/2013 Knudson ................ G06Q 30/00
455/414.1
2013/0287256 A1* 10/2013 Narasimha ........... G06K 9/6201
382/103

* cited by examiner

IMAGE RECOGNITION METHOD FOR OFFLINE AND ONLINE SYNCHRONOUS OPERATION

BACKGROUND OF THE INVENTION

Field of the Invention

The present invention relates to a recognition method, in particular, further relates to a recognition method about synchronously performing an image recognition method on two ends.

Description of Related Art

For the convenience of users to check related data of a physical product, technologies of the image recognition become popular in recent years. The image recognition takes a photo on a physical product, and determines what the physical product is after analyzing and recognizing the photo, and retrieves the related data of the physical product offering to users for reference.

Generally speaking, the current image recognition technologies are categorized into online recognition and offline recognition. The offline recognition integrates the required data by the recognition in an offline device, such as a personal computer or a mobile device, and the offline device executes the recognition operation. The online recognition transfers the photo of the physical product captured by users to an online server and the server performs the recognition operation.

When using an offline device for performing offline recognition, users are allowed to obtaining recognition result the fastest because the operation is not involved with network data transfer. Nonetheless, because the offline device has limited saving space, the offered matching data quantity is limited as a result. Though the offline recognition provides faster recognition, but the accuracy rates are low.

Alternatively, when using a server for performing online recognition, the required recognition time is much longer than the offline recognition because the operations involves with the network data transfer, for example uploading photos taken by users, and transferring recognition results to the devices of the users via networks after the server completes recognition. Nonetheless, the saving space of servers are large, and are capable of saving large amount of matching data and the accuracy rates accordingly are much higher than the offline recognition.

As a result, it is the focus of the inventor to develop a technology which providing the advantages of offline recognition and online recognition.

SUMMARY OF THE INVENTION

The objective of the present invention is to provide an image identifying method for offline and online synchronous operation, which obtains a fastest recognition result via offline recognition of a mobile device, and obtains a most accurate recognition result via online recognition of an recognition server.

In order to implement the above, the present invention retrieves the image frames of an recognition target to send to an recognition server when a user operates a mobile device to focus an recognition target in stationary status. Next, the mobile device executes an offline recognition operation, and synchronously the recognition server executes an online recognition operation. A plurality of the matching data is saved in the mobile device, and a plurality of recognition data is saved in the recognition server, wherein the quantity of the plurality of recognition data is higher than the quantity of the plurality of the matching data. When the mobile device first generates an recognition result, the recognition result is then displayed on a display monitor of the mobile device for user searching reference. If an recognition result replied from recognition server is received before the mobile device completes an recognition, the recognition result replied from the recognition server is displayed on the display monitor.

Generally speaking, the offline recognition operation performed by a mobile device is not involved with the Internet data transfer, a user is allowed to obtain an recognition result within a short time. The disadvantage is that the mobile device has limited memory space, and only provides limited data quantity for recognition matching. Alternatively, online servers include large data quantity for recognition matching, and provide more accurate recognition results. Yet, the disadvantage is that the data transfer is limited to the Internet bandwidth, and the time to obtain recognition results is longer for users.

Compare with the prior arts, the advantage provided by the present invention is that the image fames of an recognition target are sent synchronously to a mobile device and a server, for simultaneously executing offline recognition and online recognition, where a user is allowed to obtain an recognition result the fastest via an recognition operation of the mobile device. Additionally, after the server completes recognition, if the recognition of the mobile device fails, or the server provides more an accurate recognition result than the recognition result of the mobile device, the recognition result of the server is offered for user searching reference. Thus the user obtains the more accurate recognition result. In other words, users enjoy the advantages of using synchronous offline recognition and online recognition via simultaneously executing the recognition according to the present invention.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
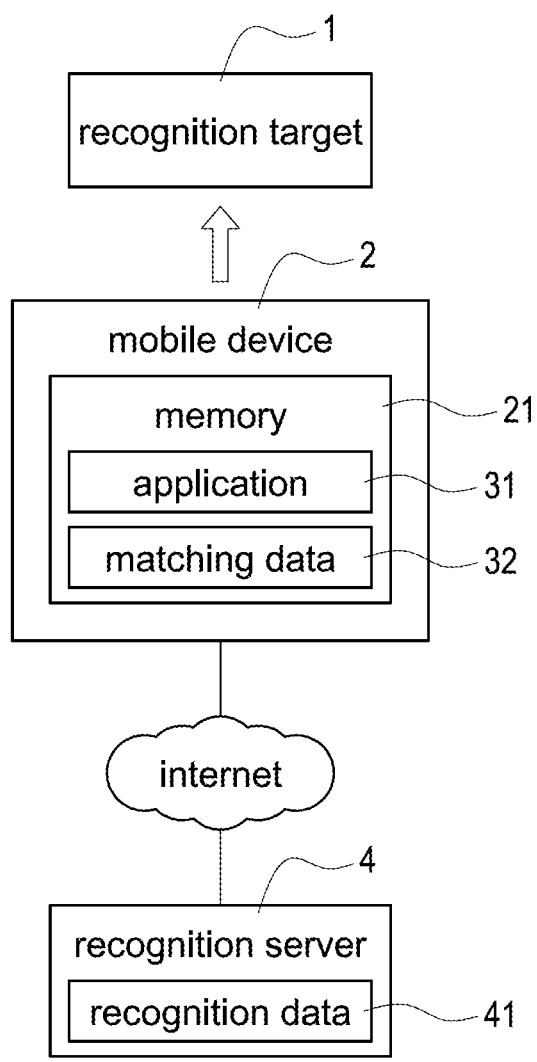
FIG. 1 is a system architecture diagram of the first embodiment according to the present invention.
Figure 2:
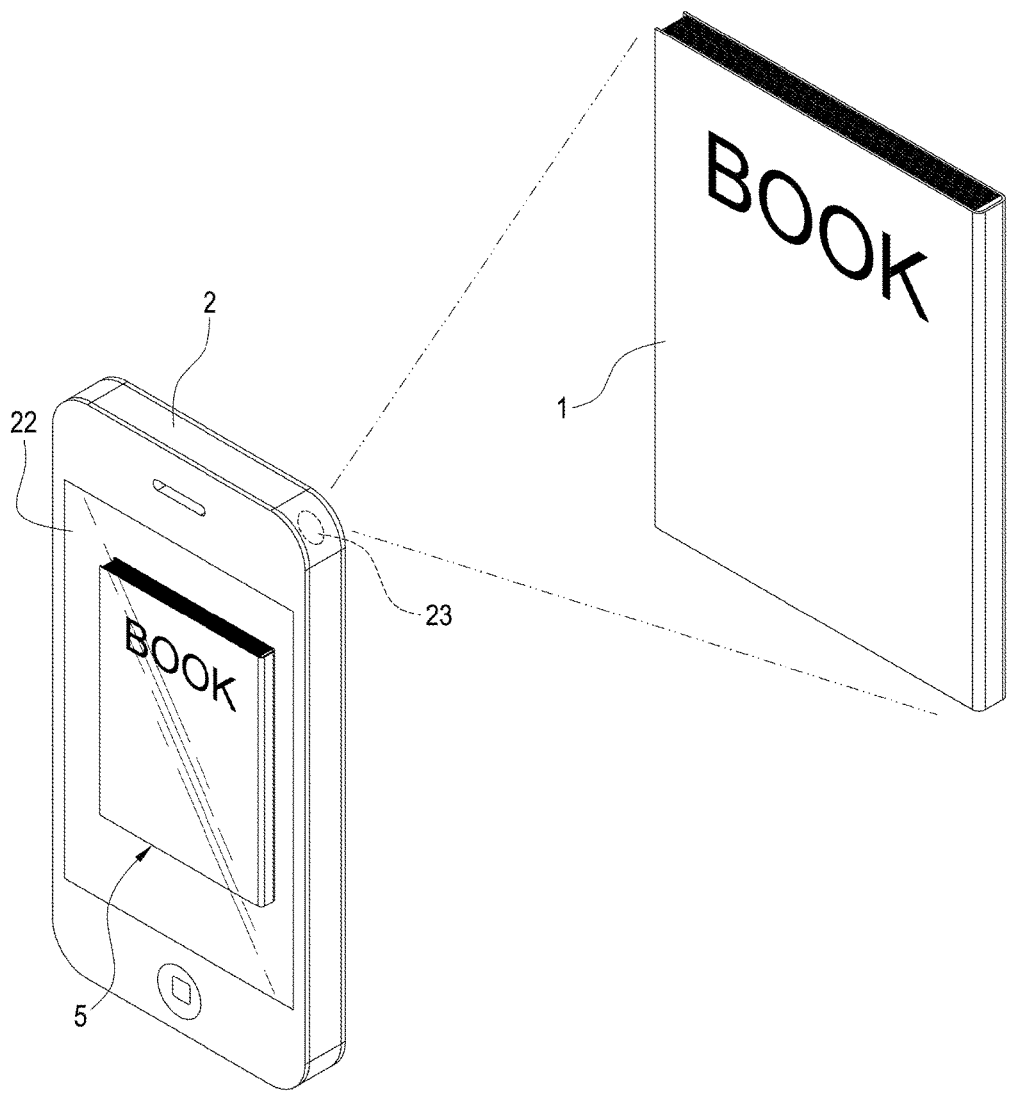
FIG. 2 is a frame capturing schematic diagram of the first embodiment according to the present invention.

FIG. 1 and FIG. 2 are a system architecture diagram and a frame capturing schematic diagram of the first embodiment according to the present invention. An image identifying method for offline and online synchronous operation according to the present invention is disclosed (referred as the recognition method in the following). The recognition method uses a mobile device 2 carried by a user and an recognition server 4 on a remote end. The mobile device 2 has a memory 21, a display monitor 22 and an image capturing unit 23 (for example a camera).

According to the recognition method, the user operates the mobile device 2, and captures image frame 5 of a physical recognition target 1 via the image capturing unit 23 on the mobile device 2. The mobile device 2 sends the frame 5 to the recognition server 4 via the Internet. Next, the mobile device 2 performs an offline recognitionimage recognition operation on the frame 5, and synchronously the recognition server 4 performs an online recognitionimage recognition operation on the frame 5. Lastly, the recognition results from the mobile device 2 and/or the recognition server 4 are displayed on the display monitor 22 for user searching reference. Thus, the user is allowed to obtain about related information of the recognition target 1 from the recognition results, such as pictures, names, places of origin, publishers, distributors, prices and purchase methods, and are not limited thereto.

The mobile device 2 saves an application 31 and a plurality of the matching data 32 in the memory 21. The application 31 performs the recognitionimage recognition on the recognition target 1, and the plurality of the matching data 32 is offered to the application 31 for performing a matching analysis. The plurality of the matching data 32 is saved in the memory 21 by the user and alternatively, the plurality of the matching data 32 is included in the application 31, and is not limited thereto. As a result that the memory 21 of the mobile device 2, such as a smart phone, a tablet or a notebook computer has limited storage capability, the quantity of the plurality of the matching data 32 is limited accordingly, for example 5 thousand or 10 thousand entries, wherein each matching data 32 comprises photos for a matching analysis and related information of the photos.

A plurality of recognition data 41 is saved in the recognition server 4. It should be noted that the plurality of recognition data 41 is similar to the plurality of the matching data 32, comprising photos for a matching analysis and the corresponding information about the photos. The difference is that the recognition server 4 generally speaking has larger saving space than the memory 21. Accordingly, the quantity of the plurality of recognition data 41 is higher than the plurality of the matching data 32, for example a million entries or ten million entries.

Further in details, an administrator compiles statistics on the plurality of recognition data 41 and selects a plurality of the products which are the most popular, the most frequently used, the best sellers, the most appraised for generating the plurality of the matching data 32. And, when developing the application 31, the plurality of the matching data 32 is saved in the application 31, or the plurality of the matching data 32 is saved in the Internet for users to download and save in the memory 31. Accordingly, there is more data provided to the recognition server 4 performs recognition for matching analysis, which offers results of better accuracy of the recognition results than the mobile device 2.

Figure 3:
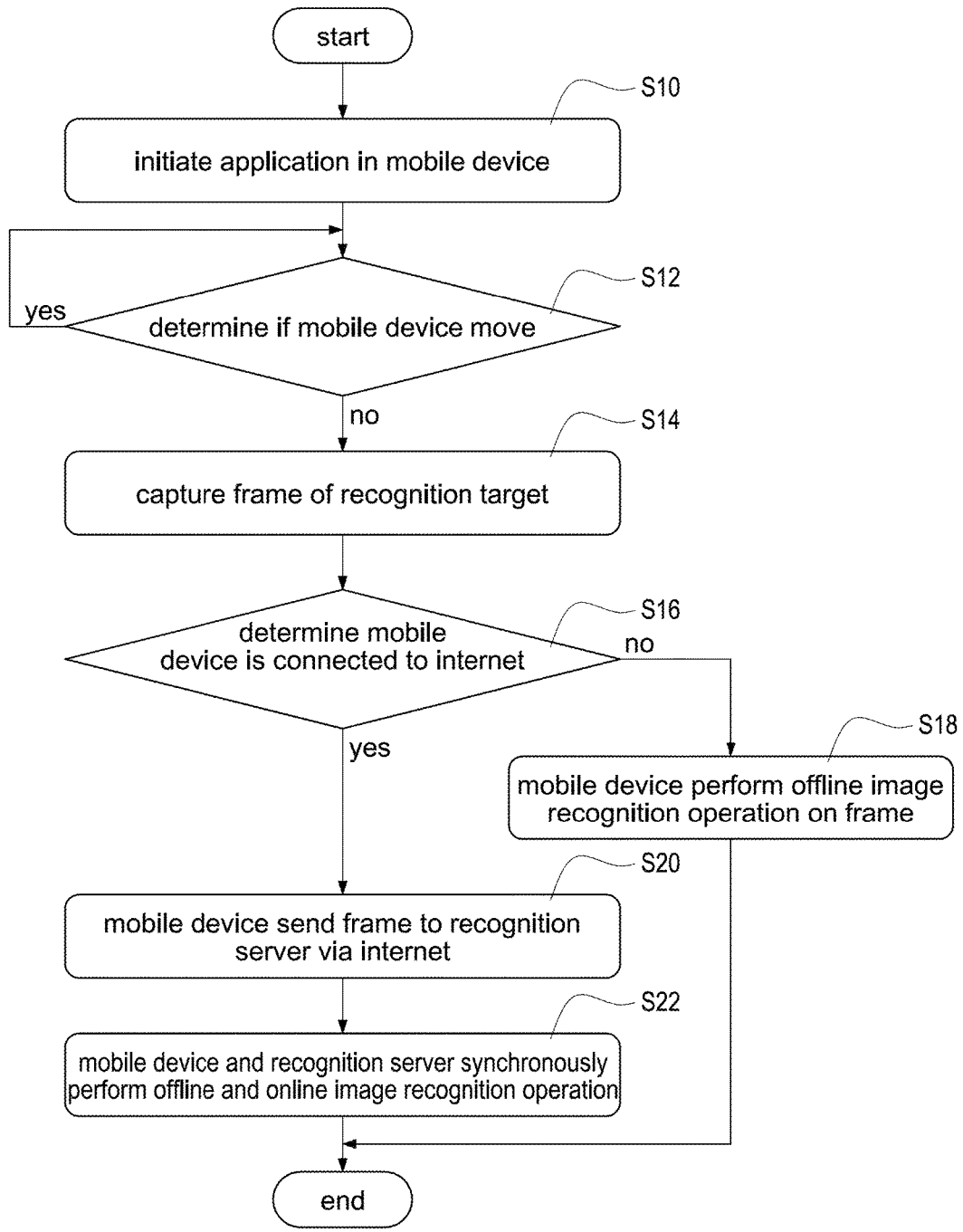
FIG. 3 is a flowchart of synchronous recognition of the first embodiment according to the present invention.

FIG. 3 is a flowchart of synchronous recognition of the first embodiment according to the present invention. According to the present invention, the recognition method performs recognition on the frame 5 of the recognition target 1 and generates an recognition result. Firstly, the mobile device 2 captures the frame 5 of the recognition target 1 via the image capturing unit 23. In details, the user has to initiate the application 31 in the mobile device 2 (step S10), and the application 31 controls the image capturing unit 23 to enter into an image capturing mode. In the image capturing mode, the image capturing unit 23 continues to capture frames of the external image. Thus, the application 31 determines if the mobile device 2 moves according to matching the before and the after frames (step S12). If the mobile device 2 continues to move, the application 31 does not execute any operation. If the mobile device 2 does not move meaning that the mobile device 2 has focused on the recognition target 1 (i.e. the current frames comprises the recognition target 1), the image capturing unit 23 captures the frame 5 of the recognition target 1 (step S14), and sent the frame 5 to the application 31.

Next, the application 31 determines if the mobile device 2 is connected to the Internet (step S16). If the mobile device 2 is not connected to the Internet, the mobile device 2 is not able to connect with the recognition server 4. Under the circumstance, the mobile device 2 performs an offline recognitionimage recognition operation on the frame 5 (step S18). In other words, the user only obtains the recognition result from the mobile device 2. If the plurality of the matching data 32 does not include similar entries to the recognition target 1, the recognition result received by the user is not valid.

In step S16, if the application 31 determines the mobile device 2 is connected to the Internet, the mobile device 2 sends the frame 5 to the recognition server 4 via the Internet (step S20). Thus, the mobile device 2 and the recognition server 4 synchronously perform offline and online recognitionimage recognition operation (step S22). Under the circumstance, the user is allowed to quickly obtain an recognition result from the recognition operation of the mobile device 2. If the recognition result of the mobile device 2 is not accurate, or the recognition fails, the user obtains the other more accurate recognition result from the recognition operation of the recognition server 4.

In details, as s result that the quantity of the plurality of the matching data 32 in the mobile device 2 is less and transferring the frame 5 and the recognition result is not involves with the Internet, it takes about 0.2 second for the mobile device 2 completing an recognition operation based on the experiments of the applicants. Nonetheless, for the same reasons, the mobile device 2 may generates a less accurate recognition result, or the recognition may fail. On the other hand, as a result that the quantity of the plurality of recognition data 41 of the recognition server 4 is large, and transferring the frame 5 and the recognition result is limited by the Internet bandwidth, it takes about 5 second for the mobile device 2 to obtain the recognition result the from the recognition server 4 based on the experiments of the applicants. Though, it takes longer to obtain the recognition result from the recognition server 4, but the data quantity is large and generally generates more accurate recognition results.

Figure 4:
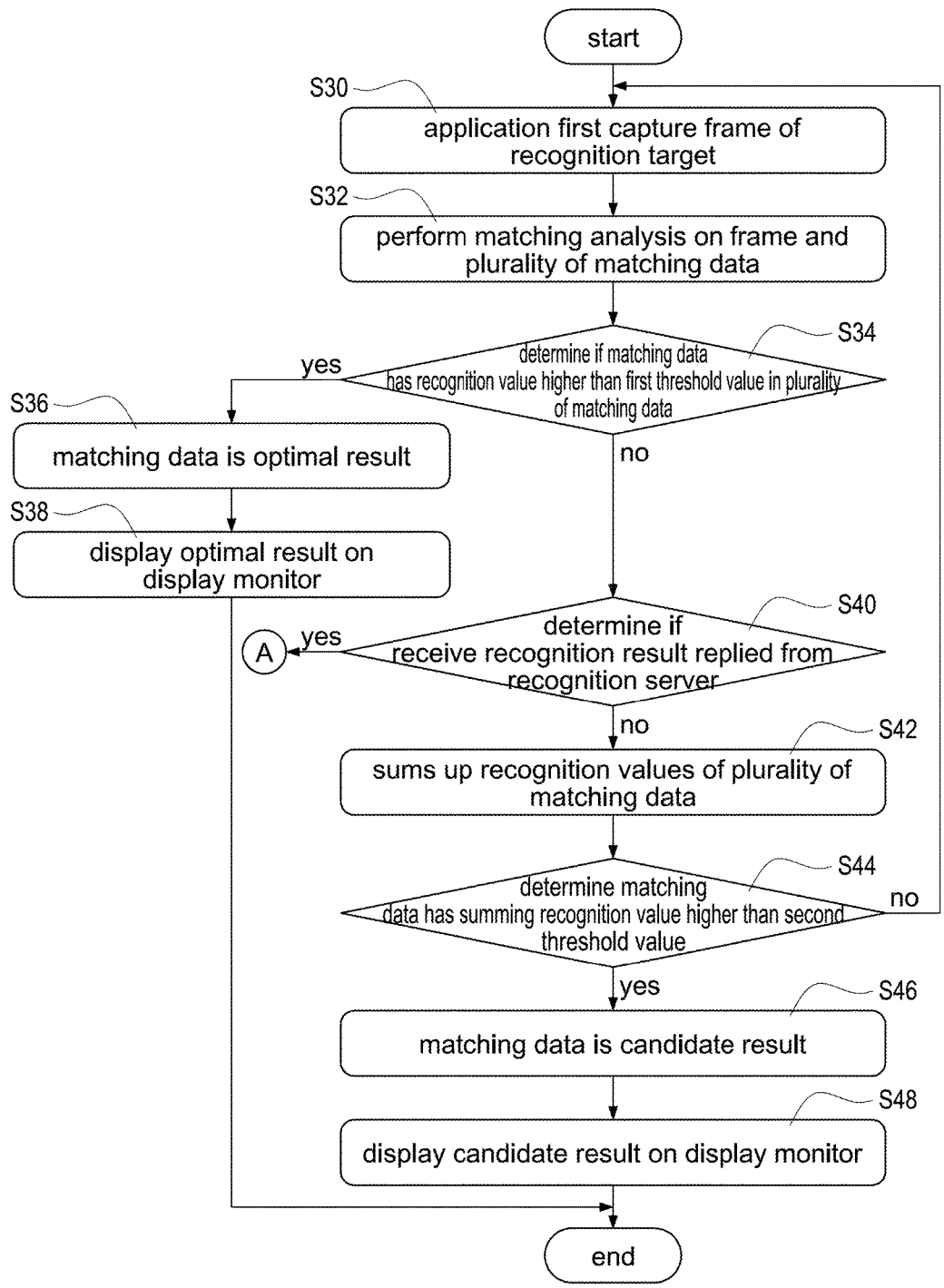
FIG. 4 is a flowchart of the first recognition operation for a mobile device of the first embodiment according to the present invention.

FIG. 4 is a flowchart of the first recognition operation for a mobile device of the first embodiment according to the present invention. In the recognition method, the mobile device 2 first executes offline recognition operation via the application 31. The application 31 first captures the frame 5 of the recognition target 1 (step S30). Next, perform a matching analysis on the frame 5 and the plurality of the matching data 32 (step S32). Thus, an recognition value of the plurality of the matching data 32 is respectively obtained. In the embodiment, the application acquires the frame 5 and one or several feature points identical or similar to each matching data 32 via the image analysis, and the recognition value means the quantity of the feature points. In other words, a higher feature value means that the similarity between the matching data 32 and the recognition target 1 is higher. The application 31 performs matching according to the recognitionimage recognition technologies based on the feature points, but is not limited thereto.

After the step S32, the application 31 determines if the matching data 32 has an recognition value higher than a first threshold value in the plurality of the matching data 32 (step S34). If the matching data 32 has an recognition value higher than a first threshold value, the matching data 32 is considered an optimal result (step S36), and the optimal result is displayed on the display monitor 22 (step S38). For example, the first threshold value is set as 20, if a matching data A has the recognition value higher than 20 (i.e., the similar feature points between the matching data A and the frame 5 are 20 points), the application 31 considers the matching data A as the optimal result, and displays the optimal result on the display monitor 22 for user searching reference.

In the step S34, the application determines that the plurality of the matching data 32 does not have data having recognition values higher than the first threshold value, then further determines if the mobile device 2 receives the recognition result replied from the recognition server 4 (step S40). If not receives the recognition result replied from the recognition server 4 (i.e., the recognition server 4 has not completed the recognition, or the recognition result is in the process of transferring), the application 31 sums up recognition values of the plurality of the matching data 32 (step S42) for respectively obtaining a summing recognition value of each matching data 32.

Next, the application 31 determines if the matching data 32 has the summing recognition value higher than a second threshold value (step S44). If the plurality of the matching data 32 does not have the summing recognition values higher than the second threshold value, the method flow backs to the step S30, the application 31 captures next frame 5 via the image capturing unit 23, and re-executes the above mentioned steps for capturing the frame 5.

On the other hand, if in the step S44, the application 31 determines if one or several matching data 32 have summing recognition values higher the second threshold value, the one or several matching data 32 are considered candidate results (step S46), and the candidate result is displayed on the display monitor 22 (step S48), for user searching reference. And, if the candidate result comprising several matching data 32, it means that the several matching data 32 are similar to the recognition target 1 to a certain level, the user is required to confirm and select the accurate matching data 32.

For example, if the first threshold value is 20, the second threshold value is 30, the recognition value of matching the matching data A and the first frame of the recognition target 1 is 10, the recognition value of matching the matching data B and the first frame is 15, both the recognition values of the matching data A, B do not exceed the first threshold value and both are not optimal results. AT the time, the application 31 respectively sum up the recognition values of the matching data A, B to be the summing recognition value. Next, when the mobile device 1 captures a second frame to be the recognition target 1, and the recognition value of matching the matching data A and the second frame is 15, the recognition value of matching the matching data B and second frame is 18, the recognition value of the matching data A, B do not exceed 20, both are not optimal results. At the time, the summing recognition value of the matching data A is 25 (10+15), and the summing recognition value of the matching data B is 35 (15+18) which exceeds than the second threshold value, so the matching data B is considered a candidate result.

The image capturing unit 23 captures photos of the recognition target 1 from different angles and the received content of the frame 5 are different. Accordingly, providing the matching data and the recognition target 1 are identical, the recognition may fail because the capture angle of the frame 5. The candidate results of the present invention apply the properties concluded above. After capture several frames of an recognition target 1, perform recognition on several matching data, then sum up the recognition values to obtain a candidate result.

Figure 5:
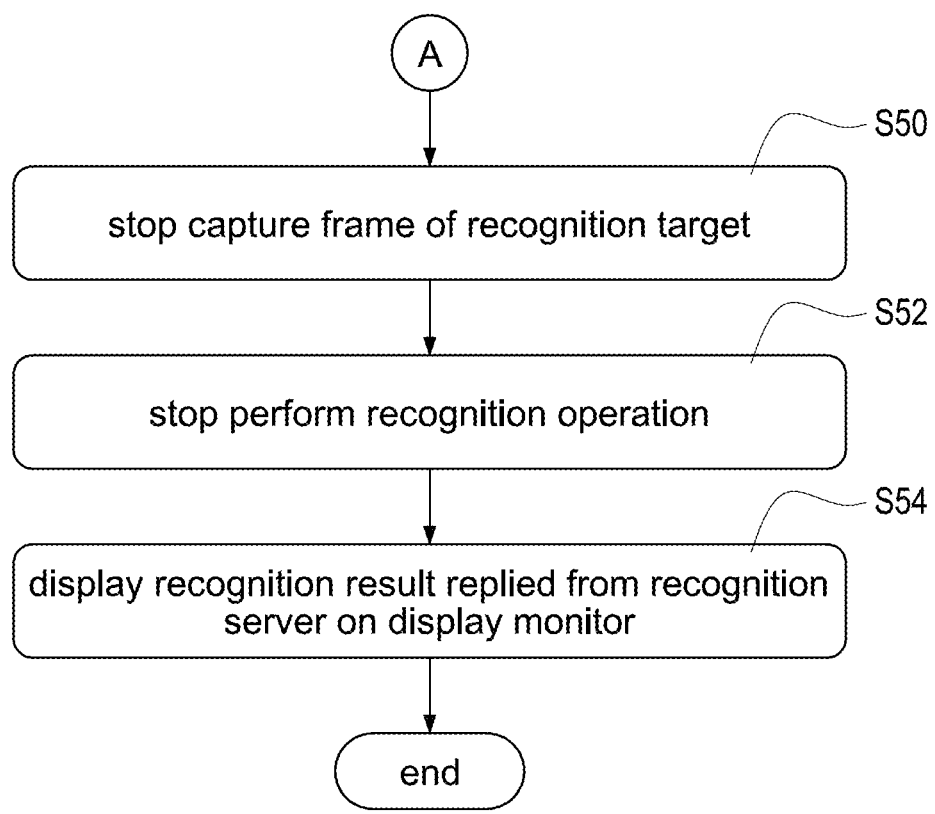
FIG. 5 is a flowchart of the second recognition operation for a mobile device of the first embodiment according to the present invention.

FIG. 5 is a flowchart of the second recognition operation for a mobile device of the first embodiment according to the present invention. In the above mentioned step S40, if the mobile device 2 has received an recognition result replied from the recognition server 4, as shown in FIG. 5, the mobile device 2 stops captures the frame 5 of the recognition target 1 (step S50). And, the application 31 stop performs recognition operation (step S52). Furthermore, the mobile device 2 displays the recognition result replied from the recognition server 4 on the display monitor 22 (step S54), for user searching reference.

As a result that the hardware capability of the recognition server 4 is higher than the mobile device 2, and the quantity of the plurality of recognition data 41 is higher than the quantity of the plurality of the matching data 32. Under the normal circumstance, the recognition accuracy of the recognition server 4 is better than the mobile device 2. Therefore, when the recognition server 4 has obtained the recognition result, but the mobile device 2 has not completed the recognition, the mobile device 2 applies the recognition result from the recognition server 4.

Figure 6:
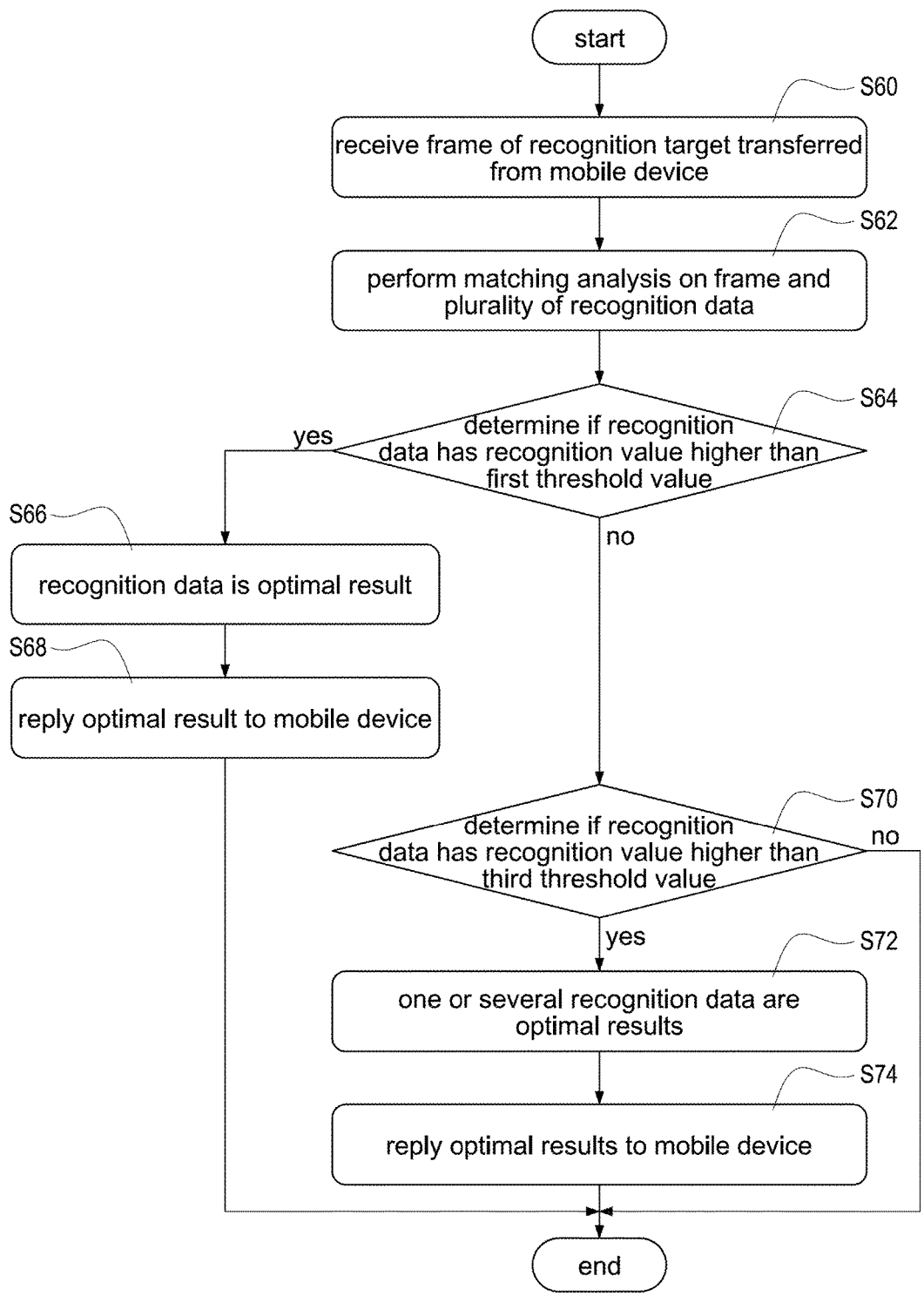
FIG. 6 is the flowchart of the recognition operation of an recognition server of the first embodiment according to the present invention.

FIG. 6 is the flowchart of the recognition operation of an recognition server of the first embodiment according to the present invention. In the recognition method, when the recognition server 4 simultaneously executes online recognition operation, the recognition server 4 first receives the frame 5 of the recognition target 1 transferred from the mobile device 2 (step S60). Next, perform a matching analysis on the frame 5 and the plurality of recognition data 41 (step S62). Thus, respectively obtain the recognition value of the plurality of recognition data 41. In the embodiment, the recognition server 4 uses recognitionimage recognition technologies which also used by and the application 31, but is not limited thereto.

The recognition server 4 determines if the plurality of recognition data 41 have the recognition values recognition higher than the first threshold value via the matching analysis in step S62 (step S64). If the recognition data 41 has the recognition valuerecognition higher than the first threshold value, the recognition server 4 considers the recognition data 41 an optimal result (step S66). The optimal result is replied to the mobile device 2 (step S68). In the embodiment, the value of the first threshold value applied by the recognition server 4 is the same with and the value of the first threshold value applied by the application 31.

In the analysis in step S62, determining the recognition values of the plurality of recognition data 41 are all less than the first threshold value, the recognition server 4 further determines if the recognition data 41 has an recognition value recognitionhigher than a third threshold value (step S70). If the recognition data 41 has an recognition valuerecognition higher than a third threshold value, the recognition server 4 considers the one or several recognition data 41 as candidate results (step S72), and replies the candidate results to the mobile device 2 (step S74).

The purpose of setting the third threshold value is to screen the recognition data 41 which is not similar to the recognition data 41. In details, if no any recognition data 41 has an recognition value recognition higher than the first threshold value, the plurality of recognition data 41 does not have data identical with the recognition target 1. Nonetheless, the result may be caused by the in appropriate capturing angle when capturing the frame 5. Accordingly, the recognition server 4 screens the recognition data 41 which is not identical via the third threshold value (for example, when the recognition value 100 is considered totally identical, the third threshold value is set as 10), and other recognition data 41 are considered candidate data offered to users to select from the candidate data. The candidate data is displayed on the display monitor 22 according to the numerical order of the recognition values of the recognition data 41 for user searching reference.

As mentioned above, the purpose of the mobile device 2 performing the offline recognition operation is that users are allowed to obtain a fastest recognition result and deliver a more comfortable user experience. Under the normal circumstance, the recognition operation performed by the recognition server 4 is less accurate than the recognition operation by the mobile device 2. Accordingly, even if the mobile device 2 completes the recognition, and displays the optimal result or the candidate result on the display monitor 22. The recognition server 4 still continues to execute the recognition operation. It should be noted that because the plurality of the matching data 32 is the part selected from the plurality of recognition data 41. Therefore, if the recognition server 4 fails to identify the frame 5, accordingly the mobile device 2 should also fail to identify the frame 5.

Figure 7:
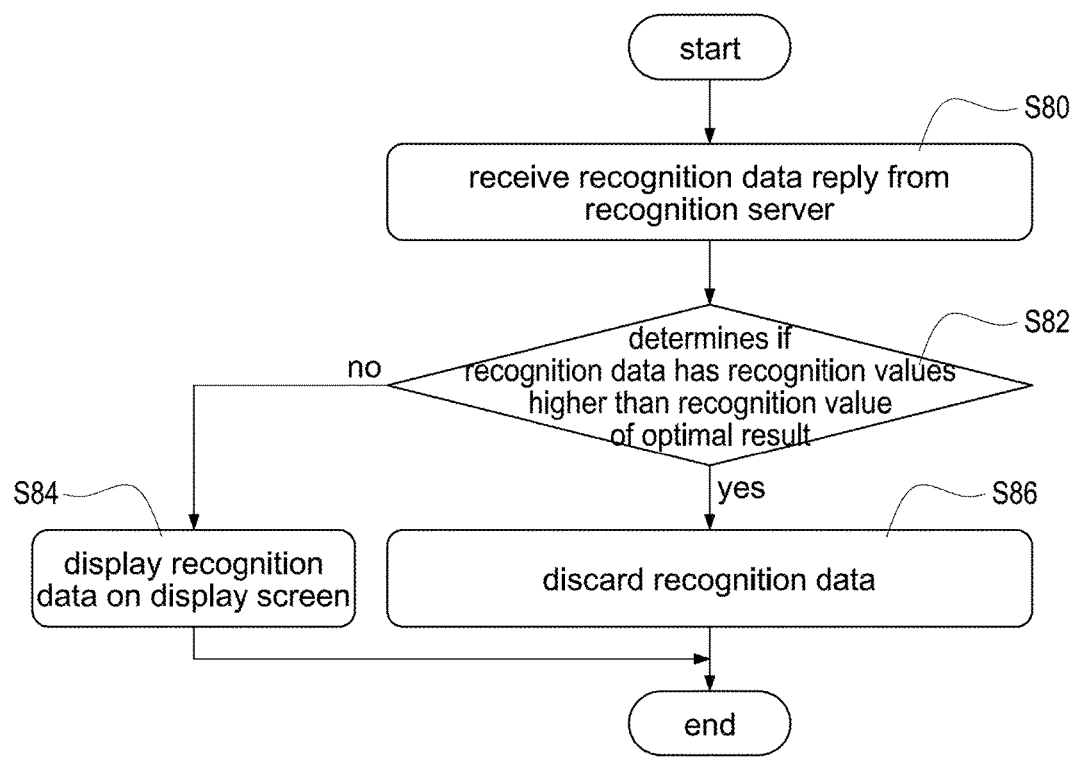
FIG. 7 is a flowchart of the third recognition operation for a mobile device of the first embodiment according to the present invention.

FIG. 7 is a flowchart of the third recognition operation for a mobile device of the first embodiment according to the present invention. When the recognition server 4 completes recognition, the mobile device 2 receives the recognition data 41 replied from the recognition server 4 (step S80). Next, the application 31 determines if the recognition data 41 has recognition values recognition higher than the recognition value of the optimal result displayed on the mobile device 2 (step S82). If the recognition data 41 does not have recognition values recognition higher than the recognition value of the optimal result, the recognition data 41 is not more identical with the recognition target 1 than the optimal result, and the application 31 discards the recognition data 41 (step S84). On the contrary, if the recognition data 41 has the recognition values recognitionhigher than the recognition value of the optimal result, the recognition data 41 is more identical with the recognition target 1 than the optimal result, the application 31 displays the recognition data 41 on the display monitor 22 (step S86) for user searching reference.

For example, the application 31 enables a popup reminding window on the display interface to inform users about another data entry for reference and list the content of the recognition data 41 such as the photo, the name and the price of the product. If the users consider the recognition data 41 is correct, the users click on the reminding window for browsing the complete content of the recognition data 41. In the other embodiment, the application 31 determines if the recognition values of the recognition data 41 are higher than the recognition value of the optimal result, and replaces the currently displayed optimal result with the recognition data 41, and displays the recognition data 41 on the display monitor 22. The users are allowed to obtain the updated display result. Nonetheless, the above mentioned is one of the preferred embodiment according to the present invention and the scope of the invention is not limited thereto.

Figure 8:
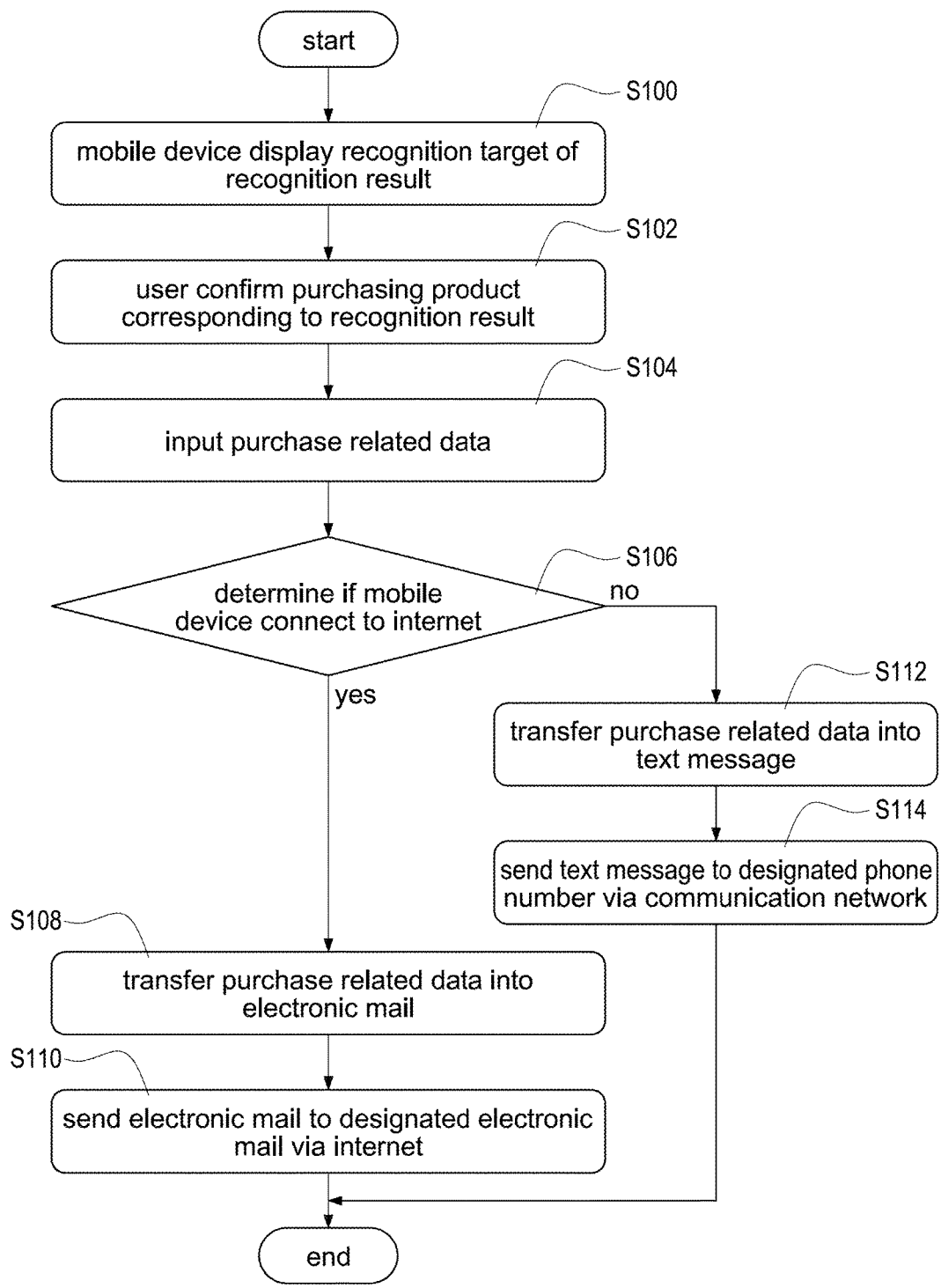
FIG. 8 is a purchase flowchart of the first embodiment according to the present invention.

FIG. 8 is a purchase flowchart of the first embodiment according to the present invention. After the mobile device 2 displays the recognition target 1 of the recognition result (step S100), the users operate the application 31, and confirm purchasing the product corresponding to the recognition result (step S102). Next, the application 31 provides an input interface to the users to input purchase related data (step S104), such as the user name, the phone numbers, the mailing address and the purchase quantity, the payment method or the credit card account number and are not limited thereto.

Next, the application 31 further determines if the mobile device 2 is connected to the Internet (step S106). If the mobile device 2 is connected to the Internet, the application 31 transfers the purchase related data into an electronic mail (step S108), and the electronic mail is sent to a designated electronic mail via the Internet (step S110) for completing the purchase operation. The designated electronic mail is saved in the application 31 such that the users are allowed to purchase related products directly upon completing the recognition.

If the mobile device 2 is not connected to the Internet, the application 31 transfers the purchase related data into a text message (step S112) and sends the text message to a designated phone number via communication network (step S114) for completing the purchase operation. The designated phone number is saved in the application 31, and the users are allowed to purchase related products with text messaging without the mobile device 2 connecting to the Internet upon completing the recognition. Thus, purchase channels are synchronously offered with or without the Internet.

As the skilled person will appreciate, various changes and modifications can be made to the described embodiments. It is intended to include all such variations, modifications and equivalents which fall within the scope of the invention, as defined in the accompanying claims.

What is claimed is:
1. An image identifying method for offline and online synchronous operation, comprising:
 a) retrieving frames of an recognition target via an image capturing unit of a mobile device;
 b) determining whether or not the mobile device is operatively connected to Internet;
 c) when the mobile device is not operatively connected to Internet, the mobile device performs offline image recognition on the frames and displaying a result of the offline image recognition on the mobile device;
 d) when the mobile device is operatively connected to Internet, the frames are sent to an recognition server via Internet;

e) following step d, the mobile device performing the offline image recognition on the frames and displaying the result of the offline image recognition on the mobile device;

f) following step d, the recognition server performing online image recognition on the frames synchronously with the mobile device;

g) the mobile device receiving a result of the online image recognition from the recognition server; and h) displaying the result of the online image recognition when the result of the online image recognition has a recognition value higher than a recognition value of the result of the offline image recognition.

2. The image identifying method of claim 1, wherein the step a comprises the following steps:
   a1) initiating an application in the mobile device and the application controlling the image capturing unit to enter an image capturing mode;
   a2) determining whether or not the mobile device moves via scanning external image by the image capturing unit;
   a3) when the mobile device moves, the image capturing unit retrieving the frames.

3. The image identifying method of claim 1, wherein a plurality of matching data is saved in the mobile device, wherein the step e comprises the following steps:
   e1) an application in the mobile device performing a matching analysis between the frames and the plurality of matching data for respectively receiving the recognition value of the plurality of matching data;
   e2) determining whether or not the matching data has the recognition value higher than a first threshold value;
   e3) the matching data being an optimal result when the matching data has the recognition value higher than the first threshold value, and displaying the optimal result as the result of the offline image recognition on a display monitor of the mobile device.

4. The image identifying method of claim 3, wherein the step e further comprises the following steps:
   e4) when no matching data has the recognition value higher than the first threshold value, determining whether or not a recognition result from the recognition server is received;
   e5) following step e4, when the recognition result from the recognition server is received, the application stopping the matching analysis; and
   e6) following step e5, displaying the recognition result from the recognition server as the result of the online image recognition on the display monitor.

5. The image identifying method of claim 4, wherein the step e further comprises the following steps:
   e7) following step e4, when the recognition result from the recognition server is not received, the application respectively summing the recognition value of the plurality of matching data for respectively obtaining a summing recognition value of the plurality of matching data;
   e8) determining whether or not the matching data has the summing recognition value higher than a second threshold value;
   e9) following step e8, when no matching data has the summing recognition value higher than the second threshold value, the image capturing unit retrieving next frame, and re-executing step e1 to step e8; and
   e10) following step e8, the matching data being candidate result when the matching data has the summing recognition value higher than the second threshold value, and displaying the candidate result as the result of the offline image recognition on the display monitor.

6. The image identifying method of claim 5, wherein the application acquires one or several feature points of the frames similar to each matching data via the image analysis, and the recognition value is the quantity of the feature points.

7. The image identifying method of claim 4, wherein a plurality of recognition data is saved in the recognition server, the quantity of plurality of recognition data is higher than the quantity of the plurality of matching data in the mobile device, and the step f comprises the following steps:
   f1) the recognition server receiving the frames sent from the mobile device;
   f2) performing a matching analysis between the frames and the plurality of recognition data for respectively retrieving the recognition value of the plurality of recognition data;
   f3) determining whether or not the recognition data has the recognition value higher than the first threshold value;
   f4) when the recognition data has the recognition value higher than the first threshold value, replying the recognition data to the mobile device as the result of the online image recognition.

8. The image identifying method of claim 7, wherein the step f further comprises the following steps:
   f5) when no recognition value of the recognition data is higher than the first threshold value, determining whether the recognition value of the recognition data is higher than a third threshold value, wherein the third threshold value is less than the first threshold value; and
   f6) following step f5, when the recognition value of the recognition data is higher than the third threshold value, replying the recognition data to the mobile device as the result of the online image recognition.

9. The image identifying method of claim 1, wherein further comprises the following steps:
   i) the application operated by a user for confirming purchasing the product corresponding to the recognition result displayed on the display monitor;
   j) receiving the input of a purchase related data;
   k) determining whether or not the mobile device is operatively connected to Internet;
   l) when the mobile device is operatively connected to Internet, transferring the purchase related data to an electronic mail;
   m) following step l, sending the electronic mail to a designated electronic mail via Internet for completing the purchase operation;
   n) when the mobile device is not operatively connected to Internet, transferring the purchase related data to a text message; and
   o) following step n, sending the text message to a designated phone number via communication networks for completing the purchase operation.

* * * * *